April 16, 1957  B. T. AASLAND ET AL  2,788,858
THREE-WHEELED ARTICULATED TRACTOR WITH ARTICULATION
AND STEERING CONTROL MEANS
Original Filed May 21, 1953  6 Sheets-Sheet 1
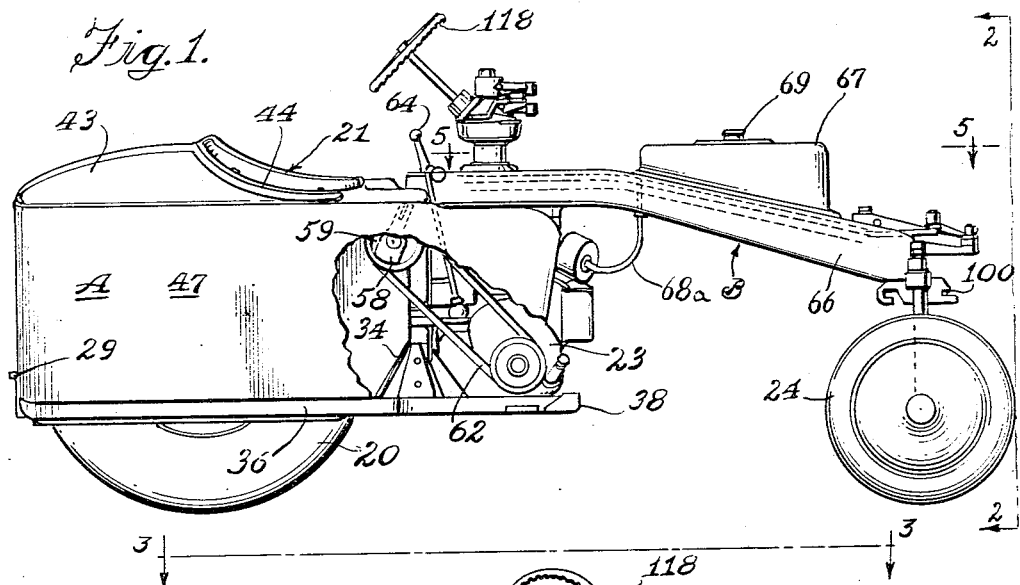
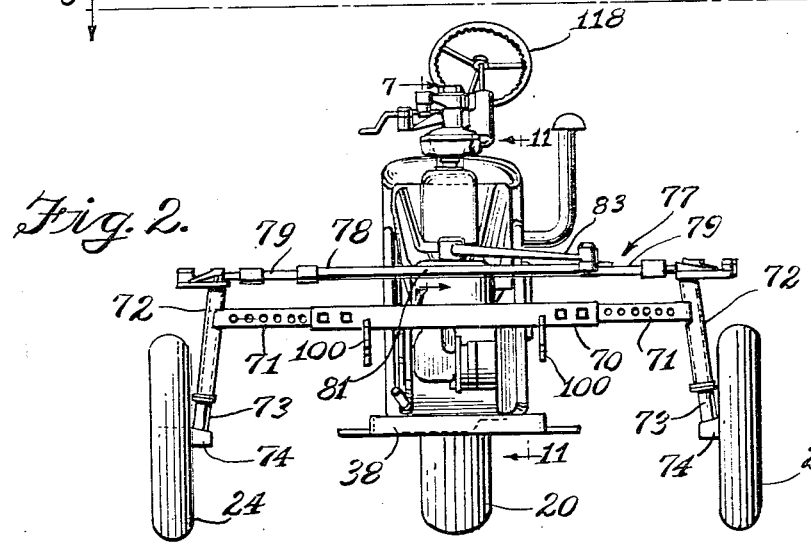
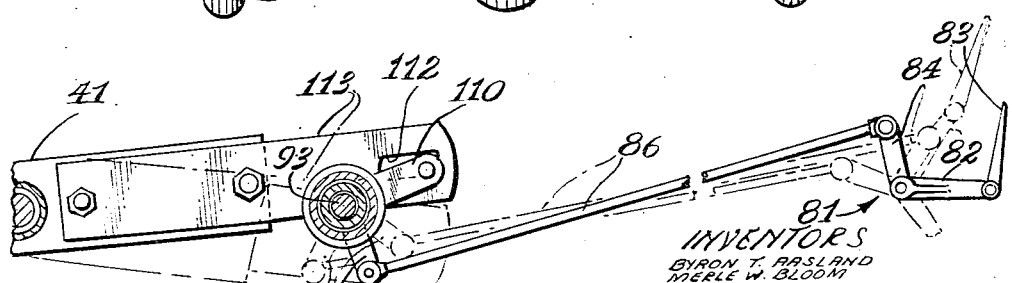
INVENTORS
BYRON T. AASLAND
MERLE W. BLOOM
WILLIAM L. ZINK
AND CLARENCE J. BUSH, DECEASED.
BY DOROTHY L. BUSH, ADMINISTRATRIX.
BY Nathan N. Kraus
Frank H. Marlos
ATTORNEYS April 16, 1957 B. T. AASLAND ET AL 2,788,858
THREE-WHEELED ARTICULATED TRACTOR WITH ARTICULATION
AND STEERING CONTROL MEANS
Original Filed May 21, 1953 6 Sheets-Sheet 2
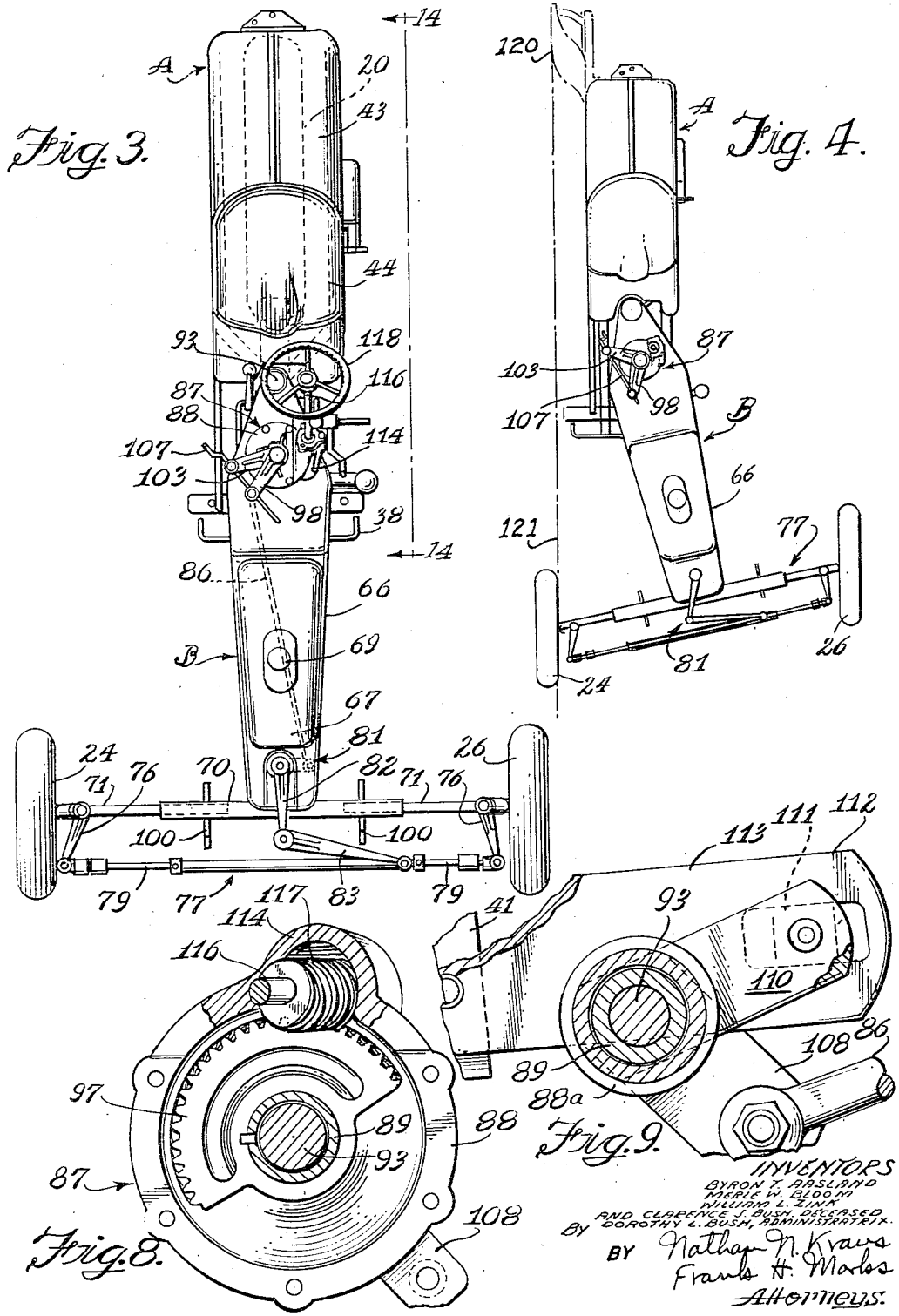

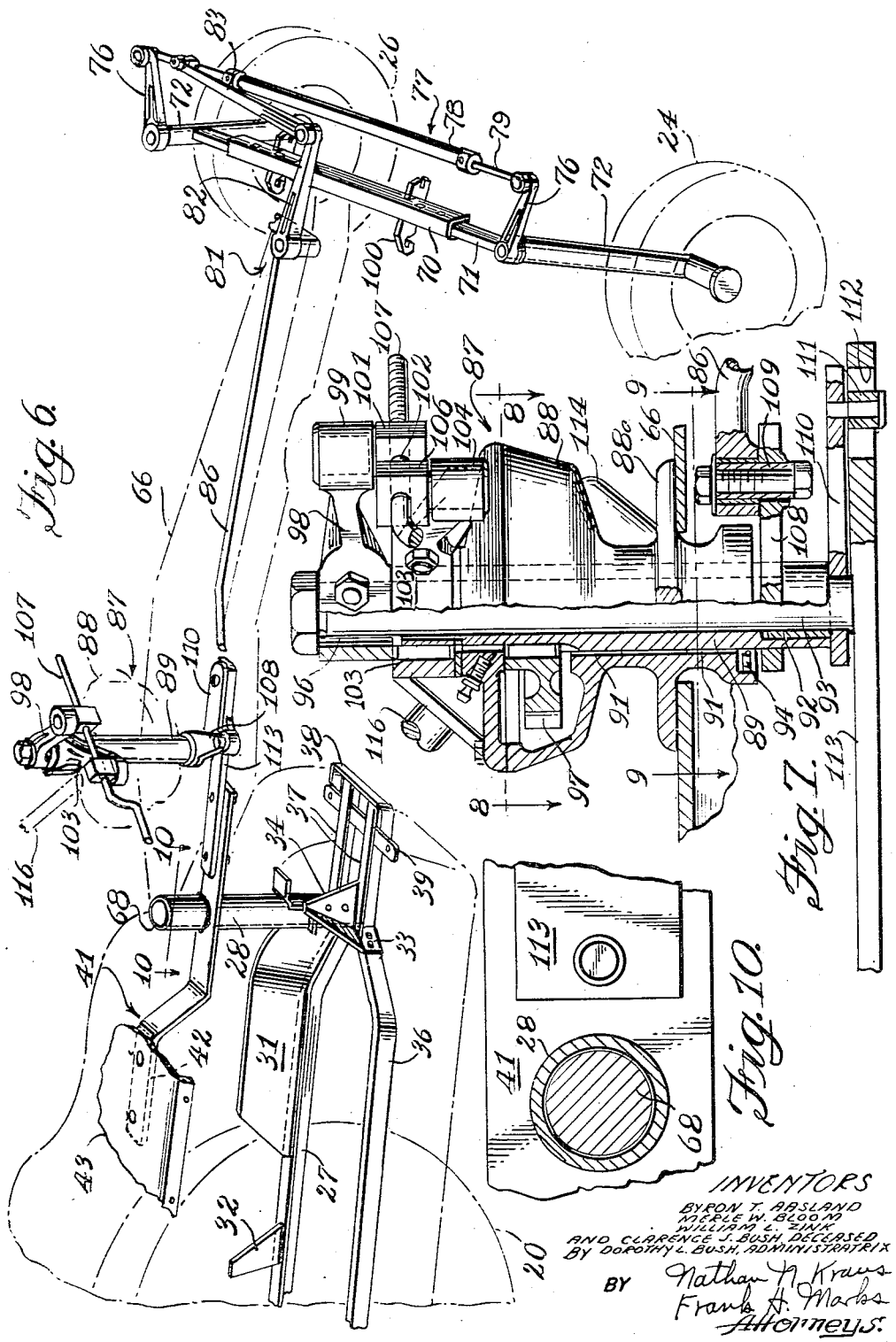

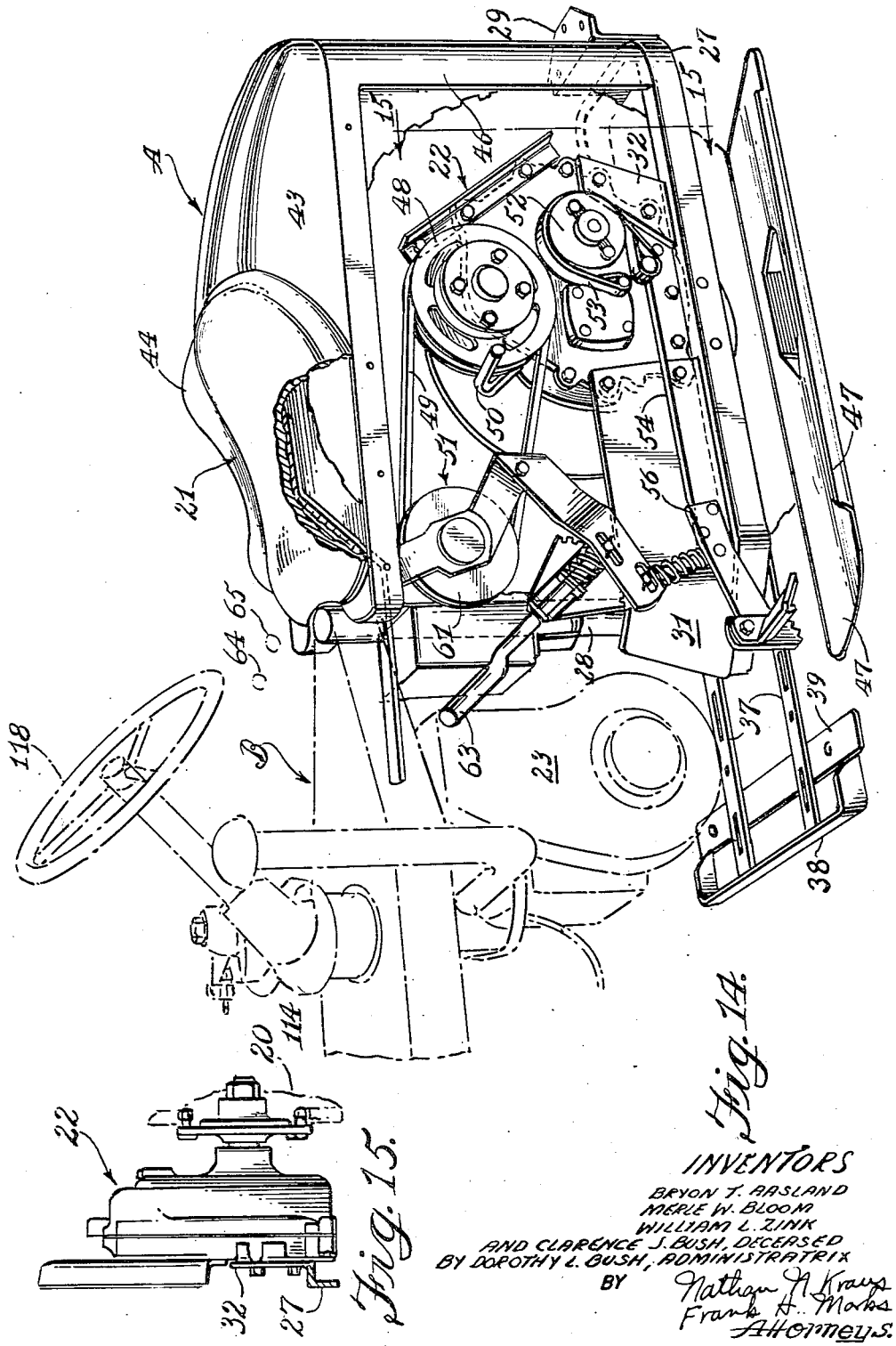

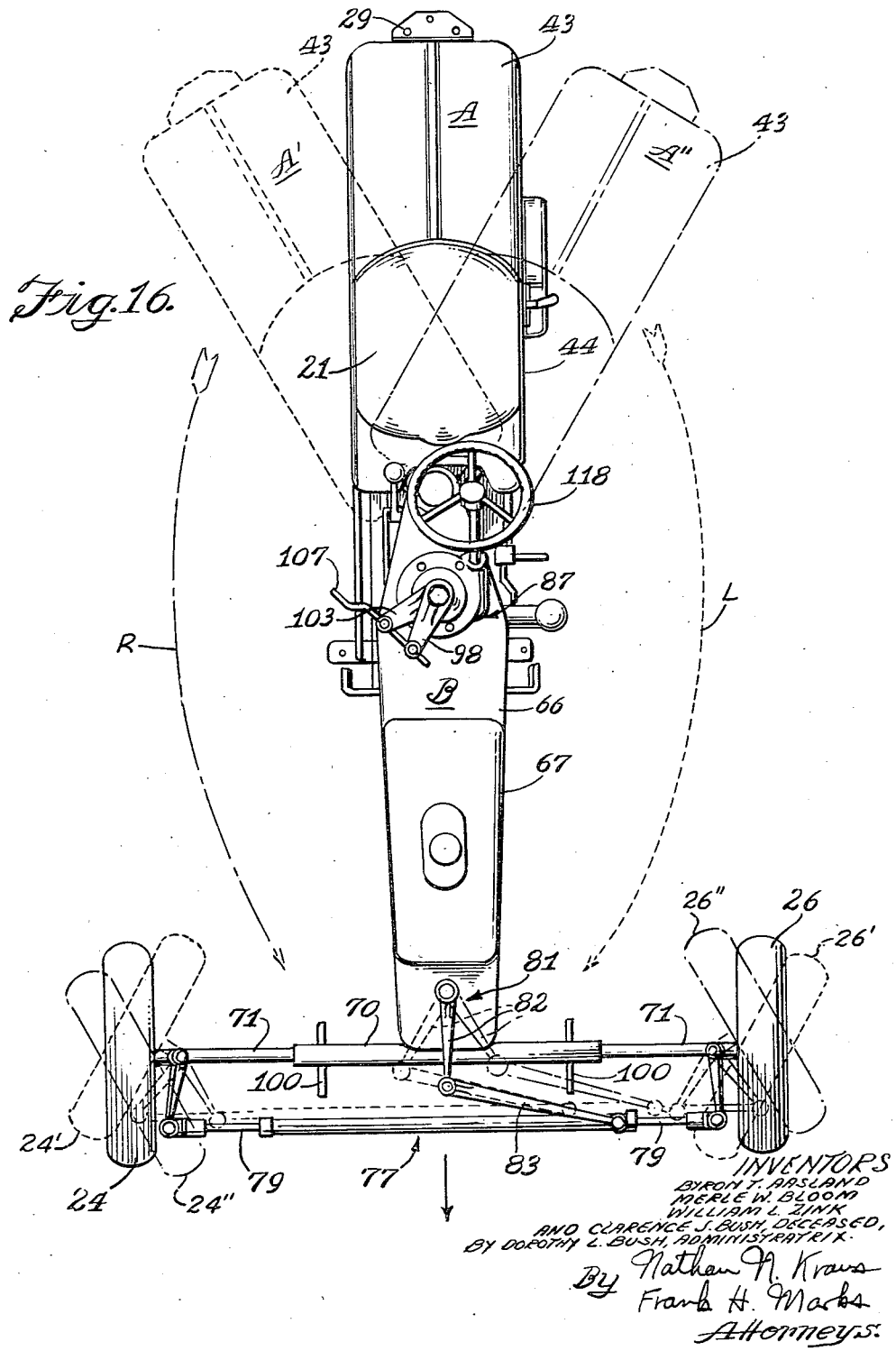

United States Patent Office 2,788,858
Patented Apr. 16, 1957

2,788,858

THREE-WHEELED ARTICULATED TRACTOR WITH ARTICULATION AND STEERING CONTROL MEANS

Byron T. Aasland and Merle W. Bloom, Kankakee, William L. Zink, Plano, and Clarence J. Bush, deceased, late of Kankakee, Ill., by Dorothy L. Bush, administratrix, Kankakee, Ill., assignors to Sears, Roebuck and Co., Chicago, Ill., a corporation of New York Continuation of abandoned application Serial No. 356,534, May 21, 1953. This application February 24, 1954, Serial No. 412,168

4 Claims. (Cl. 180—25)

This application is a continuation of application Serial No. 356,534, filed May 21, 1953, now abandoned.

Our invention relates to a motor driven vehicle of the three-wheeled tractor type for use in plowing or other farm operations, wherein the rear wheel provides the traction for propelling the tractor.

One of the objects of our invention is the provision of a tractor of the foregoing type which will be capable of delivering the maximum draft power for its size and weight.

Another object of our invention is the provision of a tractor of the foregoing type in which steering is accomplished by simultaneous turning of both front and rear wheels whereby the rear of the tractor frame having a drawbar connection is caused to follow in the direction to which the front wheels are turned so that the angle of the line of draft coincides with the direction to which the front wheels are turned.

Another object of our invention is the provision of a tractor of the foregoing type having the ability to turn in a very short radius, this feature being the result of the novel manner in which the wheels are mounted and arranged.

A further object of our invention is the provision of a tractor in which the rear traction wheel is arranged to steer simultaneously with the front steering wheels thereby avoiding liability of the rear wheel dragging or skidding during a turning operation.

Still a further object of our invention is the provision of a tractor having an articulated body and means for effecting a canting of the rear body section relative to a medial-longitudinal axis of the forward body section of the tractor so that in operation the traction wheel may be positioned to avoid running over standing crops.

A further object of our invention is the provision of a tractor so constructed that the rear body section may be adjustably canted from the forward body section so as to compensate for side draft when drawing implements in trailbehind and offset relation.

A still further object of our invention is the provision of a removable frame section facilitating the removal and replacement of the rear traction wheel.

Other and further objects and advantages of our invention will become apparent from the following description when considered in connection with the accompanying drawings in which Fig. 1 is a side elevational view of a tractor in accordance with our invention;

Fig. 2 is a front end view looking in the direction of the arrows 2—2 of Fig. 1;

Fig. 3 is a top plan view looking in the direction of the arrows 3—3 of Fig. 2;

Fig. 4 is a similar view on a reduced scale showing the tractor in a different position of operation;

Fig. 5 is a cross sectional view on an enlarged scale taken substantially on line 5—5 of Fig. 1;

Fig. 6 is a perspective view showing the frame structure and associated steering mechanism;

Fig. 7 is a cross sectional view partly in elevation and taken substantially on line 7—7 of Fig. 2;

Fig. 8 is a cross sectional view taken substantially on line 8—8 of Fig. 7;

Fig. 9 is a cross sectional view on an enlarged scale taken substantially on line 9—9 of Fig. 7;

Fig. 10 is a cross sectional view taken substantially on line 10—10 of Fig. 6;

Fig. 14 is a perspective view looking in the direction of arrows 14—14 of Fig. 3; and Fig. 15 is an end elevational view of certain structural details and looking in the direction of arrows 15—15 of Fig. 14.

Fig. 16 is a top plan view showing in broken lines how steering of the tractor is effected.

Figure 11:
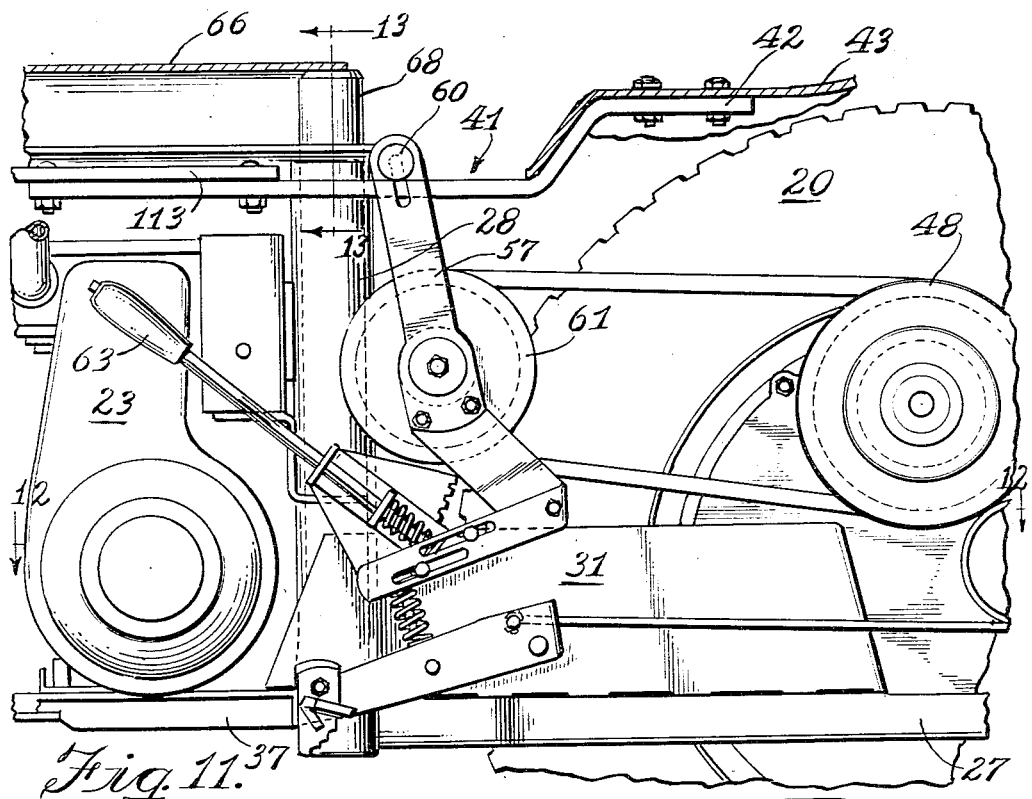
Fig. 11 is a fragmentary side elevational view looking in the direction of arrows 11—11 of Fig. 2.
Figure 12:
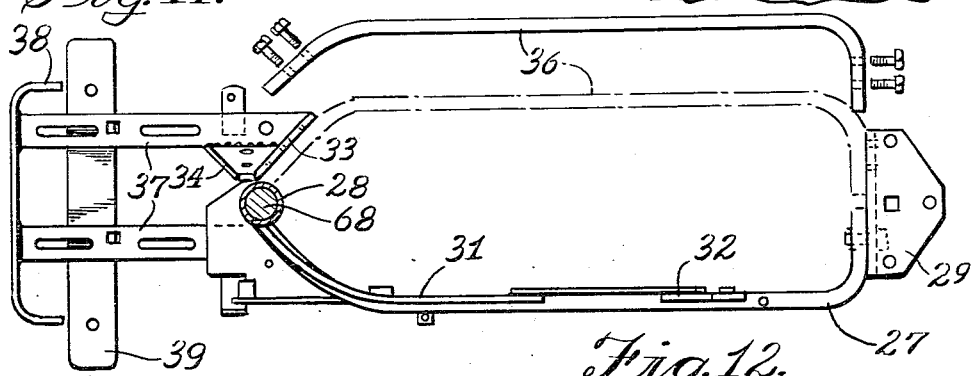
Fig. 12 is a top plan view of the rear tractor frame looking in the direction of arrows 12—12 of Fig. 11.
Figure 13:
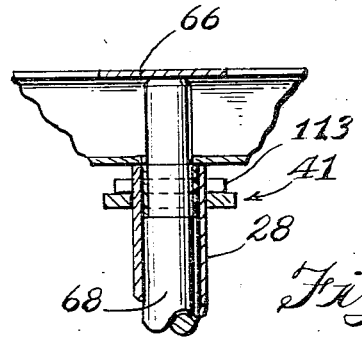
Fig. 13 is a cross sectional view taken substantially on line 13—13 of Fig. 11.

Referring to the drawings, our invention comprises, in effect, two articulated body sections, a rear body section A supported by a single tractor wheel 20 and carrying the operator's seat 21, transmission mechanism 22 and an engine 23, and a front body section B supported by a pair of front steering wheels 24 and 26 and hingedly connected, as will be hereinafter described, to the rear body section A. Said rear body section A comprises a main frame portion 27 preferably formed of rectangular section bar and shaped in plan view substantially as illustrated in Fig. 12. The said frame member is welded at its forward end to a vertical tubular post 28 and the rearward end of said frame member is bent at a right angle to the longitudinal axis thereof and has bolted thereto an angle member 29 provided with a plurality of perforations for connecting the drawbar of an implement for drawing the same in pullbehind relation. A plate bracket member 31 angularly formed as illustrated in Figs. 6 and 12 is welded to the frame member 27 and to the vertical post 28. A bracket member 32 spaced rearwardly from the bracket member 31 is similarly welded to the frame member 27 and both of said bracket members are provided with perforations to receive bolts which serve to attach the power transmission means indicated generally by the numeral 22 and hereinafter to be described. A frame portion 33 is welded to the other side of the vertical post 28 and is braced by one or more gusset plates 34 which are welded thereto and to the vertical post 28. A removable frame portion 36 shaped in plan substantially as illustrated in Fig. 12 is provided with perforations to receive bolts by which the said frame portion may be attached to the fixed frame portion 27 to assume the position shown by the broken lines in Fig. 12. Welded to the frame portions 27 and 33 and extending forwardly thereof are a pair of members 37 providing an engine support mounting and supported thereon is a gasoline engine 23 of conventional construction. Welded to the forward end of the engine support members 37 is a bumper 38 affording protection to the gasoline engine. Bolted to the members 37 transversely thereof is an implement attaching bar 39 which also affords a rest for the operator's feet. A member 41 provided with an aperture to receive the vertical post is welded thereto near the top thereof. The rearward portion 42 of the said member is offset upwardly to afford support for a housing 43 which is bolted thereto, the said housing being contoured to provide a seat 44 for the operator of the vehicle, the said seat being suitably padded with cushioning material. The housing 43 includes a rearward portion 46 which rests on the frame portion 27 and is suitably bolted thereto. The housing is provided on both sides with substantially identical side walls 47 arranged for removable attachment thereto. It will be apparent that the weight of the operator when seated is supported both on the member 41 as well as by the housing portion 43.

A suitable transmission means 22 is bolted to the bracket members 31 and 32 as illustrated more particularly in Fig. 14, the said transmission means being provided with a gear case and gearing 48 operated through a belt 49 driven by a pulley supported on a variable speed means indicated generally by 51 and presently to be described. The operation of the gearing is effected through manipulation of the shift lever 50. The transmission means include a brake drum 52 arranged to cooperate with an encircling brake band 53 operative through a brake rod 54 connected to a foot actuated pedal 56. The said power transmission means includes a spindle mounting the traction wheel 20 arranged to operate within the frame structure. It will be apparent that removal of the said traction wheel may be facilitated by first removing the frame portion 36 from the remainder of the frame structure thereby permitting the traction wheel to be drawn in a direction parallel to the axis of the spindle without necessitating lifting of the wheel in any way.

The variable speed means 51 includes a jack shaft suitably supported on brackets 57 and 58 one at each end, said brackets being supported by and slideable axially of member 60 transversely supported on the member 41. The construction of the variable speed means forms no part of the present invention, but suffice it to say that it includes V-belt adjustable diameter pulleys 59 and 61 one at each end of the jack shaft, pulley 59 being connected by means of a belt 62 to the driving pulley of the engine and pulley 61 being connected by means of a belt 49 to the driven pulley 48 of the transmission means. Through the medium of a floating sleeve assembly, not shown, which sleeve assembly is actuated by a hand operated lever 63, the effective diametral relationship of the pulleys 59 and 61 on the jack shaft may be varied to selectively vary the speed of operation of the traction wheel 20. Operating levers 64 and 65 suitably connected to the clutch and throttle of the engine respectively provide means for controlling the operation of the same.

The front body section B of the tractor comprises a body 66 which may be shaped as illustrated in Figs. 2 and 3 and formed of relatively heavy sheet metal and preferably channel shaped in cross section. The body 66 is formed with a protuberant portion 67 having an opening at the top thereof and provided with a closure cap 69, the said portion 67 accommodates a fuel tank bolted in position and connected by means of a conduit 68a to the engine 23. As will be seen more clearly by reference to Fig. 3, the main portion of the body 66 tapers gradually towards its forward end with the rear portion tapering sharply rearwardly and having welded at the end thereof a vertical shaft or spindle 68 which is disposed at a right angle to the longitudinal axis of the body 66. The said spindle is adapted to be received within the tubular post 28 of the rear body section A and to move pivotally relative thereto. Thus, it will be apparent that we have provided an articulated structure in which the body sections A and B are hinged together along a vertical axis. Rigidly connected to the forward end of the body 66 is a bolster 70 formed preferably of a tubular member square in cross section, each end of the bolster being open to telescopically receive longitudinally adjustable axle members 71 to which are welded the inclined struts 72. The bolster and axle members are provided with a series of holes adapted when in registration to receive bolts for securing the parts in positions of longitudinal adjustment. The said struts are tubular and receive kingpins 73 to which are welded axle spindles 74 on which are supported the forward wheels 24 and 26. Connected to the upper ends of the kingpins 73 are arms 76 which extend forwardly and are pivotally connected by a tierod 77 which insures simultaneous turning of the front wheels 24 and 26 by the steering gear. The tierod 77 which is longitudinally adjustable is comprised of a center tubular section 78 and telescoping ends 79 and is provided with suitable means for locking the parts in a position of adjustment. Welded to the bolster 70 are spaced brackets 100 providing means by which implements may be attached to the tractor.

The steering gear includes a bell crank 81 mounted at the forward end of the body section 66, one of the arms 82 of the bell crank being connected to the tie rod 77 by means of a link 83. The other arm of the bell crank 81 is connected by means of a pull rod 86 to the steering means presently to be described. The front wheels 24 and 26 may be steered in accordance with the movment of the pull rod 86 which is shiftable through its pivotal connection with an element of a steering means, indicated generally by the numeral 87. Said steering means includes a housing 88 shaped substantially like that illustrated in Fig. 7, the said housing being provided with a lower flange 88a bolted to the top of the body 66. As will be apparent, that portion of the steering means 87 which is below the flange 88a passes through an aperture in the body 66 and is disposed within the said body. A sleeve 89 is arranged for rotation within bushings 91 suitably press fitted within the bore of the housing. Received within the sleeve 89 for relative rotation in suitable bearings 92 pressfitted within the sleeve is a rock shaft 93. As will be apparent the rock shaft extends above and below the sleeve 89. The lower end of the housing 88 is preferably counterbored or otherwise enlarged to receive a packing gland 94 to retain lubricant within the housing. Substantially one-half of the upper portion of the sleeve 89 is provided with a key slot 96 and substantially medially of said sleeve there is keyed thereto a segmental gear 97 housed within the enlarged portion of the housing. Referring to Fig. 7, the uppermost end of the rock shaft 93 has clamped thereto a lever arm 98 provided with a bored offset boss 99 and pivotally connected thereto in depending relation is a block 101 having a transversely threaded hole 102. Keyed to the sleeve 89 and disposed immediately below the lever arm 98 is a similar lever arm 103 also having a bored bossed end 104 offset from the main body of the arm. The said bossed end supports a pivot block 106 which is bored transversely to receive an adjusting crank 107 one end of which is threaded and cooperates with the threaded bore 102 of the block 101. Upon rotation of the adjusting crank 107 the angular relationship between the lever arms 98 and 103 may be varied, it being apparent that any change in the relation of the said lever arms will correspondingly affect the relation of the rock shaft 93 to the sleeve 89. Welded to the lower end of the sleeve 89 extending below the housing 88 is a lever arm 108 having a hollow stem 109 at the end thereof. To said stem is pivotally connected a pull rod 86 which is operatively connected with the front steering wheels 24 and 26 as hereinbefore explained. Welded to the lower end of the rock shaft 93 is a lever arm 110 having a hollow stem welded thereto and on which is supported block 111, the said block being adapted to slide in the cammed slot 112 of the pivot arm 113 bolted to the member 41. Any rocking of the lever arm 110, of course, will effect a rocking of the pivot arm 113 about the axis of the post 28 with a consequent turning of the rear body section A.

Referring to Fig. 8 it will be seen that the housing 88 has an integral side portion 114 arranged to support a steering column 116 on the end of which is fixed a worm 117 cooperating with the segmental gear 97 for rotating the same. It will be apparent that when the steering wheel 118 on the column 116 is rotated, in one direction or another, rotation of the segmental gear 97 is effected with corresponding rotation of the sleeve 89 which effects a rocking of the lever arm 108 which influences through the movement of the pull bar 86 the direction assumed by the front wheels 24 and 26. Since the rock shaft 93 is operatively connected to the sleeve 89 through the medium of the threaded crank 107 and lever arms 98 and 103 any rotation of the sleeve 89 is imparted to the rock shaft 93 so that both the sleeve and rock shaft are caused to rotate simultaneously upon rotation of the steering wheel 118.

In Fig. 16 is illustrated the range of movement of the body sections and of the front and rear wheels in a steering operation, the solid lines indicating the normal position and the broken lines extreme right and left positions. It will be seen that upon rotation of the steering wheel 118, lever arms 108 and 110 are simultaneously rocked and effect simultaneous movement of the pivot arm 113, which influences the direction assumed by the traction wheel 20, and the pull rod 86 which influences the direction assumed by the front wheels 24 and 26. It will be clear however, that while the rock shaft 93 and sleeve 89 may be caused to rotate simultaneously, the construction illustrated provides for relative adjustment between the said rock shaft and sleeve so that the adjusted relationship between the lever arms 108 and 110 may be varied.

In operation an operator normally occupies seat 44 sitting astride the tractor with his feet resting on the bar 39. Before operation of the tractor, however, the front wheels 24 and 26 are spaced inwardly or outwardly relative to each other to adjust the distance between the said wheels and thereby provide adequate clearanc to avoid injury to standing crops. When the tractor is running in a normally straight line and is pulling an implement which is connected to the implement drawbar connection 29 at the rear of the tractor the three wheels assume the position illustrated in Fig. 3. As the operator steers the front wheels by rotation of the steering wheel 118, in one direction or another, simultaneous movement of the rear traction wheel 20 is also effected as was hereinbefore explained.

Referring to Fig. 16, assuming that the operator desires to negotiate a right hand or clockwise turn in the direction of arrow L, it will be seen that as the front wheels are turned to the broken line positions indicated by numerals 24' and 26', the rear body section A which includes the traction wheel 15 is turned oppositely to position A', thus the rear body section A is swung in a direction to which the front wheels 24 and 26 are turned so that the line of direction coincides with the direction of the turn. In this manner, there is achieved the desired objective of making the traction wheel 15 push in a path coinciding with the front wheels as a turn is being made and also of greatly accelerating the turning of the tractor through an arc having a shorter radius. Thus, slippage of the tractor wheel is eliminated, a condition which would be otherwise present if the traction wheel were driving along a medial longitudinal line of the tractor frame instead of complementing the direction of turn as in the present instance. When the operator turns the front wheels to his left for a counterclockwise turn in the direction indicated by arrow R, the wheels assume positions indicated by numerals 24" and 26" and the rear body section A is turned to assume position A". It will be apparent that in accomplishing the turning the entire tractor body undergoes a central bending or articulation about the axis of the vertical pivot post 28 so that as viewed in plan, the tractor has a loose joint effect in accomplishing the steering arrangement hereinbefore described.

As was hereinbefore explained and as clearly illustrated in Fig. 4 the front and rear body sections A and B of the tractor may be adjustably canted in relation to each other and maintained in such canted relation during the operation of the tractor. Such an adjustment is frequently necessary to compensate for side draft as when operating the tractor on a hillside or slope. Additionally, since the tractor is intended for relatively light duty service it is capable of pulling only a single bottom plow 120 which is preferably connected to the left side of the tractor. By canting the tractor body substantially in the angular relation illustrated in Fig. 4 it will be seen that the plow bottom may be so positioned that when the front wheel 24 is riding in a furrow already plowed, as indicated by the broken line 121, the plow bottom is properly positioned to turn over an adjacent furrow without leaving an intervening land space between furrows being plowed. In the operating condition illustrated in Fig. 4 the front wheels of course are turned in the direction of travel parallel to the longitudinal axis of the rear body section A. It will, of course, be understood that the body sections A and B may be canted in an opposite relation from that illustrated in Fig. 4.

It will be understood that in the foregoing and other explanations of our invention the term "tractor" may also be taken to apply to a vehicle having two rear traction wheels.

Various changes coming within the spirit of our invention may suggest themselves to those skilled in the art. Hence we do not wish to be limited to the specific embodiments described or uses mentioned, but intend the same to be merely exemplary, the scope of our invention being limited only by the appended claims.

We claim:

1. A tractor comprising a body formed of a front and a rear section, the rear section including a frame having an upright post secured thereto, a traction wheel supported to operate within said frame and movable laterally as a unit therewith, the front section having at the rearward end thereof a shaft mounted coaxially with said post and movable relative thereto whereby one of said sections is shiftable about the axis of said post from normal to angular position relative to the other section, said front section having at its forward end a pair of dirigible steering wheels, and steering control means for said steering wheels and rear frame comprising a pair of interconnected concentric shaft members controlled by a steering device, a lever linkage connecting one of said shaft members to said pair of dirigible steering wheels, and a second lever linkage connecting the other concentric shaft member to said rear frame whereby said traction wheel is caused to follow in the direction in which the dirigible wheels are steered.

2. In a motor vehicle a body formed of front and rear sections, the rear section including a frame having an upright tubular post, a member fixed on said post and having a portion extending in a forward direction, the front section having at the rearward end thereof a spindle arranged to be received in said post and movable relative thereto whereby said rear section is shiftable about the axis of said post from normal to angular position relative to said front section, a pair of dirigible wheels supporting said front section, a traction wheel supporting said rear section, a sleeve supported for rotation on said front section, upper and lower arms fixed to said sleeve, a shaft rotatably supported in and extending through said sleeve, upper and lower arms fixed to said shaft, the lower arm of said sleeve being operatively connected with said dirigible wheels, the lower arm of said shaft being operatively connected with said forwardly extending portion, adjustable screw means connecting said upper arms for adjustably fixing the angular relation therebetween and thereby shifting the rear section about the axis of said post from normal to angular position relative to the front section, and means operatively connected with said sleeve for rotating the same whereby said shaft is simultaneously rocked, the simultaneous movement of said sleeve and shaft effecting simultaneous steering of said dirigible wheels and shifting of said rear section about the axis of said post whereby said traction wheel is caused to follow in the direction in which the dirigible wheels are turned.

3. In a motor vehicle a body formed of front and rear sections, the rear section including a frame having an upright tubular post, a member fixed on said post and having a portion extending in a forward direction, the front section having at the rearward end thereof a spindle arranged to be received in said post and movable relative thereto whereby said rear section is shiftable about the axis of said post from normal to angular position relative to said front section, a pair of dirigible wheels supporting said front section, a traction wheel supporting said rear section, a sleeve supported for rotation on said front section, upper and lower arms fixed to said sleeve, a shaft rotatably supported in and extending through said sleeve, upper and lower arms fixed to said shaft, the lower arm of said sleeve being operatively connected with said dirigible wheels, the lower arm of said shaft being operatively connected with said forwardly extending portion, adjustable screw means connecting said upper arms for adjustably fixing the angular relation therebetween and thereby shifting the rear section about the axis of said post from normal to angular position relative to the front section, a gear carried on said sleeve, a steering wheel and column, a pinion carried on said column and in operative engagement with said gear, the rotation of said steering wheel effecting simultaneous movement of said sleeve and shaft, said movement effecting simultaneous steering of said dirigible wheels and shifting of said rear section about the axis of said post whereby said wheel is caused to follow in the direction in which the dirigible wheels are turned.

4. A tractor comprising a body formed of a front and a rear section, the rear section including a frame having an upright post secured thereto, a traction wheel supported to operate within said frame and movable laterally as a unit therewith, the front section having at the rearward end thereof a shaft mounted coaxially with said post and movable relative thereto whereby one of said sections is shiftable about the axis of said post from normal to angular position relative to the other section, said front section having at its forward end a pair of dirigible steering wheels, and steering control means for said steering wheels and rear frame comprising a pair of interconnected coaxial members controlled by a steering device, a lever linkage connecting one of said members to said pair of dirigible steering wheels, and a second lever linkage connecting the other coaxial member to said rear frame whereby said traction wheel is caused to follow in the direction in which the dirigible wheels are steered, the coaxial members of the steering control means being interconnected adjustably in a radial direction for variably shifting the initial angular position of the rear section relative to the front section.

References Cited in the file of this patent

UNITED STATES PATENTS

| | | |
|---|---|---|
| 2,193,367 | Harrison et al. | Mar. 12, 1940 |
| 2,253,420 | Cupal | Aug. 19, 1941 |
| 2,325,396 | Hastings | July 27, 1943 |

FOREIGN PATENTS

| | | |
|---|---|---|
| 499,199 | Belgium | Mar. 1, 1951 |
| 22,650 | Great Britain | Oct. 5, 1909 |
| 446,691 | Great Britain | May 5, 1936 |